United States Patent
Brane

[11] 3,797,323
[45] Mar. 19, 1974

[54] TIME VARIABLE VALVE APPARATUS

[76] Inventor: Earl P. Brane, P.O. Box 605, Largo, Fla. 33540

[22] Filed: Sept. 5, 1972

[21] Appl. No.: 286,458

[52] U.S. Cl. .................................. 74/55, 251/263
[51] Int. Cl. ........................................... F16h 25/08
[58] Field of Search ........ 74/55, 568; 251/242, 253, 251/262, 263

[56] References Cited
UNITED STATES PATENTS

| | | | |
|---|---|---|---|
| 3,174,324 | 3/1965 | Ostertag | 251/263 |
| 1,160,484 | 11/1915 | Wright | 251/263 |
| 1,454,367 | 5/1923 | Yardley | 251/263 |
| 2,772,067 | 11/1956 | Wilson | 251/263 |
| 2,872,149 | 2/1959 | Battey et al. | 251/263 |
| 3,142,186 | 7/1964 | Metton et al. | 251/263 |
| 273,015 | 2/1883 | Birch | 74/55 |
| 2,216,318 | 10/1940 | Lewis | 74/568 |

FOREIGN PATENTS OR APPLICATIONS

| | | | |
|---|---|---|---|
| 679,933 | 8/1939 | Germany | 74/55 |

Primary Examiner—Benjamin W. Wyche
Assistant Examiner—Wesley S. Ratliff, Jr.
Attorney, Agent, or Firm—Woodard, Weikart, Emhardt & Naughton

[57] ABSTRACT

A time variable apparatus for controlling a valve. A first and second cam are mounted to a shaft rotatably driven adjacent to a piston which extends outwardly from a frame adjacent to the cams. One cam is operable to force the piston head to a first position whereat a spring biased latch secures the piston in the first position. The second cam is operable to release the latch thereby allowing the piston to move to a second position. The second cam is slotted and receives a fastener extending outwardly from the first cam. The fastener may be loosened so as to adjust the relative rotational positions of the second cam with respect to the first cam thereby allowing for adjustment and control of the duration during which the piston is in either position.

7 Claims, 6 Drawing Figures

PATENTED MAR 19 1974 3,797,323

TIME VARIABLE VALVE APPARATUS

BACKGROUND OF THE INVENTION

1. Field of the Invention

This invention is in the field of cams for operating valves.

2. Description of the Prior Art

Many types of rotatably mounted cams have heretofore been proposed for use in operating various types of valves. Typically, the valves are spring biased to a first position and are movable to a second position during the time which the piston is contacted by the cam. In the event that it is desirable to change the duration of time during which the piston is in the second position, it is necessary to change the cam since typically the cam has a fixed portion for contacting the piston. Disclosed herein is an apparatus which includes a pair of cams mounted together and a latch mounted adjacent the cams. One cam is utilized to force the pistons to a second position wherein it is locked in place by means of the latch. The second cam is then utilized to release the latch and allow the piston to move back to the first position. The two cams are secured together but may be adjusted so as to control the positioning between the two cams allowing for adjustment and control of the valve or piston movement.

SUMMARY OF THE INVENTION

One embodiment of the present invention is a time variable valve apparatus comprising a frame having a first cylinder, a first piston slidably mounted in the cylinder and having a protruding head, the piston being movable from a first position to a second position, a rotatably driven shaft mounted on the frame, a first member mounted on the shaft, the first member having a first cam contacting the head and moving the piston from the first position to the second position as the shaft rotates, latch means movably mounted on the frame operable to hold the piston in the second position, and a second member mounted on the shaft, the second member having a second cam contacting and releasing the latch means as the shaft rotates allowing the piston to move from the second position to the first position, the second cam having a normally fixed position with respect to the first cam and being adjustably movable with respect to the first cam controlling the time period between the first cam contacting the head to the second cam contacting the latch means.

It is an object of the present invention to provide a new and improved time variable valve apparatus.

It is a further object of the present invention to provide a valve apparatus which includes easily adjustable cams for controlling the movement of the valve contacted by the cams.

Related objects and advantages of the present invention will be apparent from the following description.

DESCRIPTION OF THE PREFERRED EMBODIMENTS

Figure 1:
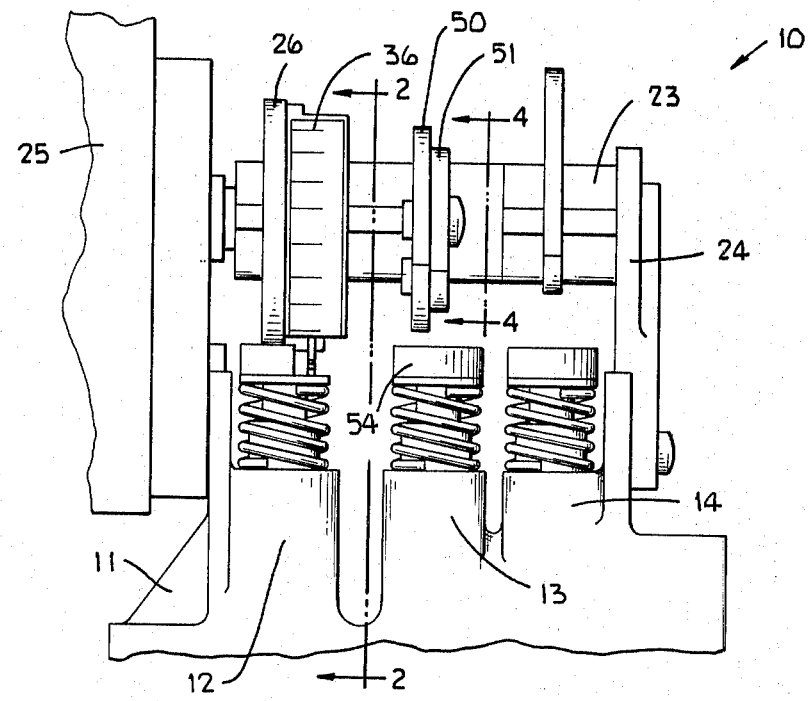
FIG. 1 is a fragmentary side elevation of an apparatus incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
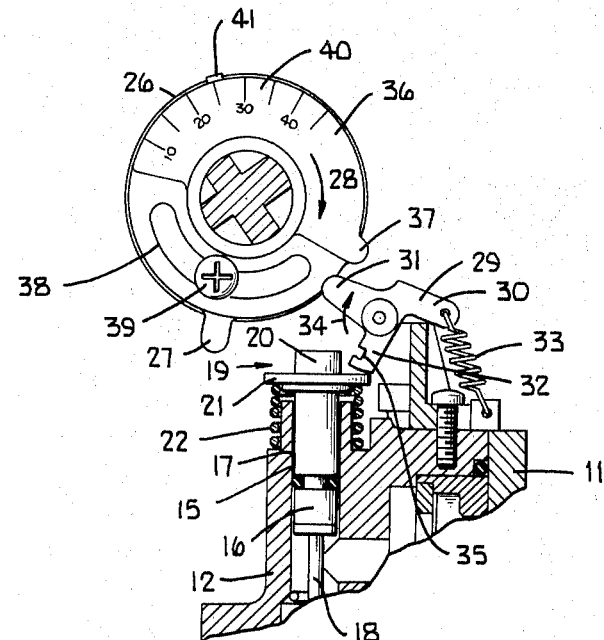
FIG. 2 is a fragmentary enlarged cross sectional view taken along the line 2—2 of FIG. 1 and viewed in the direction of the arrows.
Figure 3:
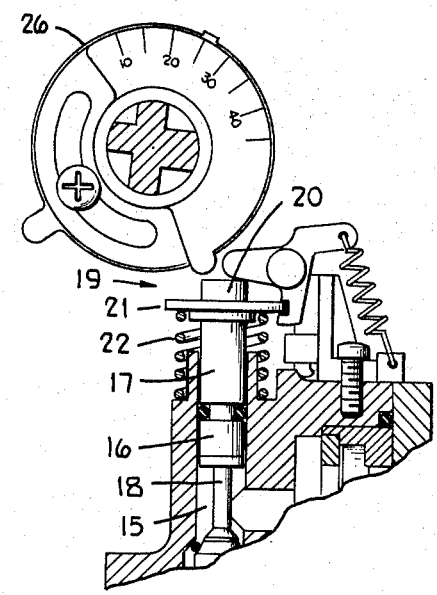
FIG. 3 is the same view as FIG. 2 only showing the piston in the upward position and the latch in the unlocked position.

Referring now more particularly to the drawings, there is shown a time variable valve apparatus 10 having a frame 11 with a plurality of upstanding tubular portions 12, 13 and 14. Tubular portion 12 will now be described, it being understood that an identical description applies to tubular portions 13 and 14. Tubular portion 12 has an internal hollow cylinder 15 through which a piston 16 is slidably mounted. Attached to the respective ends of piston 16 are a pair of rods 17 and 18. Rod 18 extends downwardly and may be connected to another piston which is movable to open and close a passage. Rod 17 extends upwardly and out of tubular portion 12 being integrally attached to a head 19 positioned atop tubular portion 12. Head 19 includes a boss 20 and a flange 21. A helical spring 22 is positioned between flange 21 and tubular portion 12 so as to normally urge the head and piston to the upward position shown in FIG. 3. The piston is movable downward to a second position which is shown in FIG. 2.

A rotatably driven shaft 23 is mounted on frame 11 being supported at one end by wall 24 and on its other end by a clock driving apparatus 25 which is secured to frame 11. A first member 26 is mounted to shaft 23 and has a cam protruding portion 27 (FIG. 2) which contacts boss 20 of head 19 so as to move the head and piston from the upward position of FIG. 3 to the downward position of FIG. 2 as the shaft rotates in the direction of arrow 28. A latch 29 is movably and pivotally mounted on frame 11 and is operable to hold the head and piston in the downward position. The lever has three arms 30 through 32 integrally connected together with a helical spring 33 connected to and between frame 11 and arm 30 thereby urging the lever to rotate in the direction of arrow 34. A notch 35 is provided in arm 32 and complimentary sized to receive flange 21.

A second member 36 is mounted on shaft 23 adjacent to member 26. Member 36 has a protruding cam 37 which contacts arm 31 and releases the latch as the shaft rotates in the direction of arrow 28 allowing the piston and head to move from the downward position shown in FIG. 2 to the upward position shown in FIG. 3. Since arm 32 is urged against head 19 by spring 33, flange 21 will fit into recess 35 whenever the head and piston are in the upward position. Subsequent rotation of the shaft will cause cam 27 to contact arm boss 20 moving the head and piston downward thereby pivoting the lever in a direction opposite of arrow 34 and releasing flange 21 from recess 35. Thereupon, lever 29 rotates in the direction of arrow 34, urged by spring 33, disposing arm 32 to hold the head and piston in the downward position.

Member 36 is provided with an arcuate slot 38 through which a standard fastener 39 projects. Fastener 39 is threadedly received by member 26 and may be tightened so as to interconnect and prevent relative motion between members 26 and 36. Therefore, cam 37 is normally fixed with respect to cam 27. By loosening fastener 39, cam 37 may be adjusted and moved with respect to cam 27 thereby to control the time period between when cam 27 contacts head 19 and when cam 37 contacts lever 29. As a result, the duration of head 19 and piston 16 in the downward position may be controlled and adjusted even though shaft 23 rotates at a constant speed. Suitable markings 40 are provided on cam 36 and may be aligned with respect to an upraised pointer 41 formed on member 26. Markings 40 are coordinated with the position of cam 37 to cam 27 to allow the operator a convenient means for indicating the relative rotational positions between the cams. It will be noted, that recess 35 is provided with a pair of surfaces for contacting the top and bottom surfaces of flange 21 for limiting the vertical movement of the head and piston.

Figure 4:
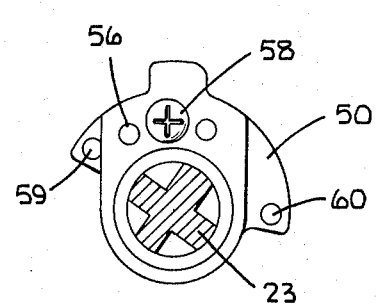
FIG. 4 is an enlarged cross sectional view taken along the line 4—4 of FIG. 1 and viewed in the direction of the arrows.
Figure 5:
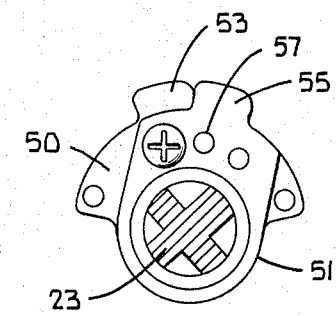
FIG. 5 is the same view as FIG. 4 only showing the cams of FIG. 4 in a sequential position.

A third member 50 is mounted on shaft 23 and has a third cam 53 for contacting head 54 of the piston received by tubular portion 13 and for moving the head and piston from an upward position to a downward position. A fourth member 51 is mounted to shaft 23 adjacent and connected to member 50. Member 51 has another cam 55 also for contacting head 54. Member 51 is provided with a pair of holes 56 and 57. A standard fastener 58 is threadedly received by member 50 and is extendable through either hole 56 and 57 for connecting members 50 and 51 together and for positioning cam 55 with respect to cam 53. When fastener 58 extends through hole 57, cams 53 and 55 are aligned thereby simultaneously contacting head 54. On the other hand, when fastener 58 extends through hole 56, cam 55 is positioned in sequential fashion with respect to cam 53 thereby increasing the length of time which head 54 is contacted and forced to the downward position. Rods 59 and 60 (FIG. 4) are integrally attached to member 50 and extend outwardly therefrom limiting the movement of member 51 with respect to member 50.

Figure 6:
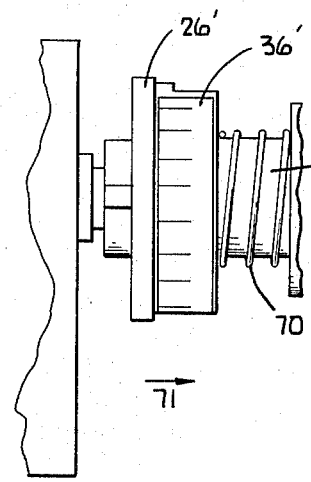
FIG. 6 is a fragmentary side view of an apparatus incorporating a different embodiment of the present invention.

An alternate and preferred embodiment of the invention utilizes a spring 70 (FIG. 6) to bias members 26' and 36' together in lieu of the fastener 39 shown in FIG. 2. The mutually facing surfaces of members 26' and 36' contact and are provided with interlocking ridges and grooves which extend radially from the centers of members 26' and 36'. In all other respects, the embodiments shown in FIGS. 1 and 6 are identical.

To adjust the time differential or positioning of the cams on members 26' and 36', the operator merely moves member 36' in the direction of arrow 71 so as to compress spring 70 and then rotates member 36' with respect to member 26' until the desired cam positioning is achieved. Member 36' is then released and is forced in locking engagement with spring 70.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A time variable valve apparatus comprising:
a frame having a first cylinder;
a first piston slidably mounted in said cylinder and having a protruding head, said piston being movable from a first position to a second position;
a rotatably driven shaft mounted on said frame;
a first member mounted on said shaft, said first member having a first cam contacting said head and moving said piston from said first position to said second position as said shaft rotates;
latch means movably mounted on said frame operable to hold said piston in said second position; and, a second member mounted on said shaft, said second member having a second cam contacting and releasing said latch means as said shaft rotates allowing said piston to move from said second position to said first position, said second cam having a normally fixed position with respect to said first cam and being adjustably movable with respect to said first cam controlling the time period between said first cam contacting said head to said second cam contacting said latch means.

2. The apparatus of claim 1 wherein:
said first and second members are adjacent and interconnected by a fastener mounted to one of said members which extends through a slot in the other of said members, said fastener prevents relative motion between said members and is releasable.

3. The apparatus of claim 2 wherein:
said latch means includes a lever pivotally mounted to said frame and spring biased against said head, said lever has a stop positioned against said head and in said second position preventing movement of said piston to said first position, said lever has a portion contactable by said second cam to move said stop away from said head and allow said piston to move to said first position.

4. The apparatus of claim 3 and further comprising:

a spring mounted between said head and said frame urging said piston to said first position.

5. The apparatus of claim 4 wherein:
said head includes a flange and said lever includes a recess complementary receiving said flange when said piston is in said second position, said stop surface is positioned in said recess and further comprising:
indicating means on said first and second members operable to indicate relative rotational positions therebetween.

6. The apparatus of claim 1 wherein:
said frame has a second cylinder and further comprising:
a second piston slidably mounted in said second cylinder with a second protruding head, said second piston movable from a third position to a fourth position;

a third member mounted on said shaft and having a third cam contacting said second head and moving said second piston from said third position to said fourth position as said shaft rotates; and, a fourth member mounted on said shaft adjacent to and connected to said third member and having a fourth cam contactable with said second head, said fourth cam being movable to a position adjacent said third cam to contact said second head and keep said second piston in said fourth position as said shaft rotates and said third cam and said fourth cam contacts said head in sequential fashion.

7. The apparatus of claim 1 and further comprising:

a spring mounted on said shaft and releasably urging said first and second members together so said members will rotate in unison.

* * * * *

UNITED STATES PATENT OFFICE
CERTIFICATE OF CORRECTION

Patent No. 3,797,323                    Dated March 19, 1974

Inventor(s) Earl P. Brane

It is certified that error appears in the above-identified patent and that said Letters Patent are hereby corrected as shown below:

In column 2, line 56, after the word "A" and before the number "35", please change "nothc" to read --notch--.

In column 3, line 1, please delete the word "arm".

In column 3, line 13, after the word "By", please change the word "looen-" to read --loosen- --.

Signed and sealed this 2nd day of July 1974.

(SEAL)
Attest:

EDWARD M. FLETCHER,JR.          C.MARSHALL DANN
Attesting Officer                Commissioner of Patents